US005425304A

United States Patent [19]

Turner

[11] Patent Number: 5,425,304

[45] Date of Patent: Jun. 20, 1995

[54] BELLOWS ACTUATOR FOR CONDITION RESPONSIVE CONTROL DEVICE AND METHOD OF MAKING THE SAME

[75] Inventor: Richard D. Turner, Knoxville, Tenn.

[73] Assignee: Robertshaw Controls Company, Richmond, Va.

[21] Appl. No.: 947,290

[22] Filed: Sep. 14, 1992

[51] Int. Cl.[6] .......... F16J 3/04

[52] U.S. Cl. .......... 92/34

[58] Field of Search .......... 92/34, 43

[56] References Cited

U.S. PATENT DOCUMENTS 1,992,212 2/1933 Horne .
2,083,943 6/1937 Clifford .......... 92/34
2,137,303 11/1938 Nelson .
2,271,020 1/1942 McMahon .......... 92/34
2,273,307 2/1942 Woods .
2,546,365 3/1951 Leveridge .
2,771,781 11/1956 Von Ranson .
2,779,197 1/1957 Embree .
3,157,055 11/1964 Medicus et al. .
3,232,126 2/1966 Pucciarello et al. .
3,933,052 1/1976 Cole .

*Primary Examiner*—F. Daniel Lopez
*Attorney, Agent, or Firm*—Watts, Hoffmann, Fisher & Heinke

[57] ABSTRACT

A condition responsive control device comprising a case, a controller carried by the case, a linkage system supported by the case and coupled to the controller, and a condition responsive linkage actuator. The actuator comprises a convoluted bellows having an anchor convolution hermetically fixed to a bellows supporting housing. An anchor convolution mounting face and a housing bellows support zone are bonded together to secure the bellows to the support housing so that the bellows operates the linkage and controller in response to pressure differentials.

24 Claims, 2 Drawing Sheets

BELLOWS ACTUATOR FOR CONDITION RESPONSIVE CONTROL DEVICE AND METHOD OF MAKING THE SAME

Field of the Invention

The present invention relates to fluid pressure operated actuators and particularly to fluid pressure operated actuators comprising extensible and retractable bellows for actuating condition responsive control devices.

Background of the Invention

Fluid pressure operated actuators including extensible and retractable bellows carried by a supporting unit have been constructed in the past. One such actuator, which may be thought of as typical, is illustrated by FIG. 1 of the drawings. This device employed an open ended "hydroformed" bellows A anchored in a cup-like support unit B by a mounting collar C which hermetically joined the open end of the cup to the open end of the bellows. A chamber D was thus formed between the support cup B and the outside of the bellows A. The chamber D was sealed from the ambient atmosphere and communicated with a pressure source via a support cup port. As the source pressure changed relative to ambient pressure the bellows extended or retracted within the cup. The closed end of the bellows was typically coupled to an electrical controller switch, or to a control valve, by an extension member and a cooperating linkage system.

The bellows A was formed from an imperforate generally cylindrical body having axially spaced annular convolutions formed about its periphery. The open end of the bellows was formed by a radially outwardly flared annular lip E.

The support cup was typically cylindrical with an internal diametral dimension somewhat larger than that of the bellows. A radially outwardly extending mounting flange encircled its open end. A suitable fitting was associated with the closed support cup end to connect the cup to the pressure source.

The mounting collar C was typically an annular member having its outer periphery joined to the open support cup end and its inner periphery joined to the annular bellows lip. The mounting collar had to be hermetically joined to both the support cup and the bellows by structurally strong, rigid connections. The usual manner of connecting these components was by brazing or welding. This was accomplished by fixturing the cup, bellows, mounting collar and brazing or welding elements together and heating them by an induction heater. Alternatively, the actuators could have been fabricated by a process where the mounting collar was attached to the cup and to the bellows in separate operational steps.

The present invention provides a new and improved bellows actuator for a condition responsive control device, and a method of making the actuator, wherein the actuator is composed of relatively few, easily assembled parts having improved strength and operational reliability and which is relatively quickly and easily fabricated compared to prior actuators.

SUMMARY OF THE INVENTION

In a preferred embodiment of the invention a pressure operated actuator is provided which comprises a bellows unit, a bellows support unit and connecting structure between the bellows unit and the bellows support unit. The bellows unit comprises an elongated continuous tubular convoluted wall disposed about a longitudinal axis, bellows end structure comprising an end wall hermetically closing one longitudinal end of the tubular wall, and bellows mounting structure spaced in the direction of the longitudinal axis from the bellows end structure and comprising an anchor convolution defining an outer peripheral mounting face and an adjoining generally longitudinally oriented face extending transverse to the direction of extent of the mounting face. The bellows support unit comprises a support member disposed about the anchor convolution, the support member defining an inner peripherally extending bellows support zone extending substantially continuously about the bellows unit and confronting the mounting face. The connecting structure is bonded to the mounting face and to the support zone to secure the bellows unit to the support unit so that upon establishment of a pressure differential between the inside and outside of the bellows unit the bellows unit extends and retracts relative to the support member.

DESCRIPTION OF THE PREFERRED EMBODIMENT

Figure 1:
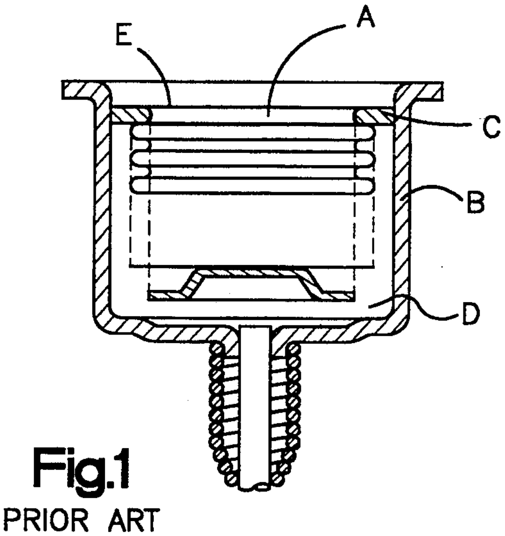
Fig.1 PRIOR ART
FIG. 1 is a cross sectional view of a prior art actuator.
Figure 2:
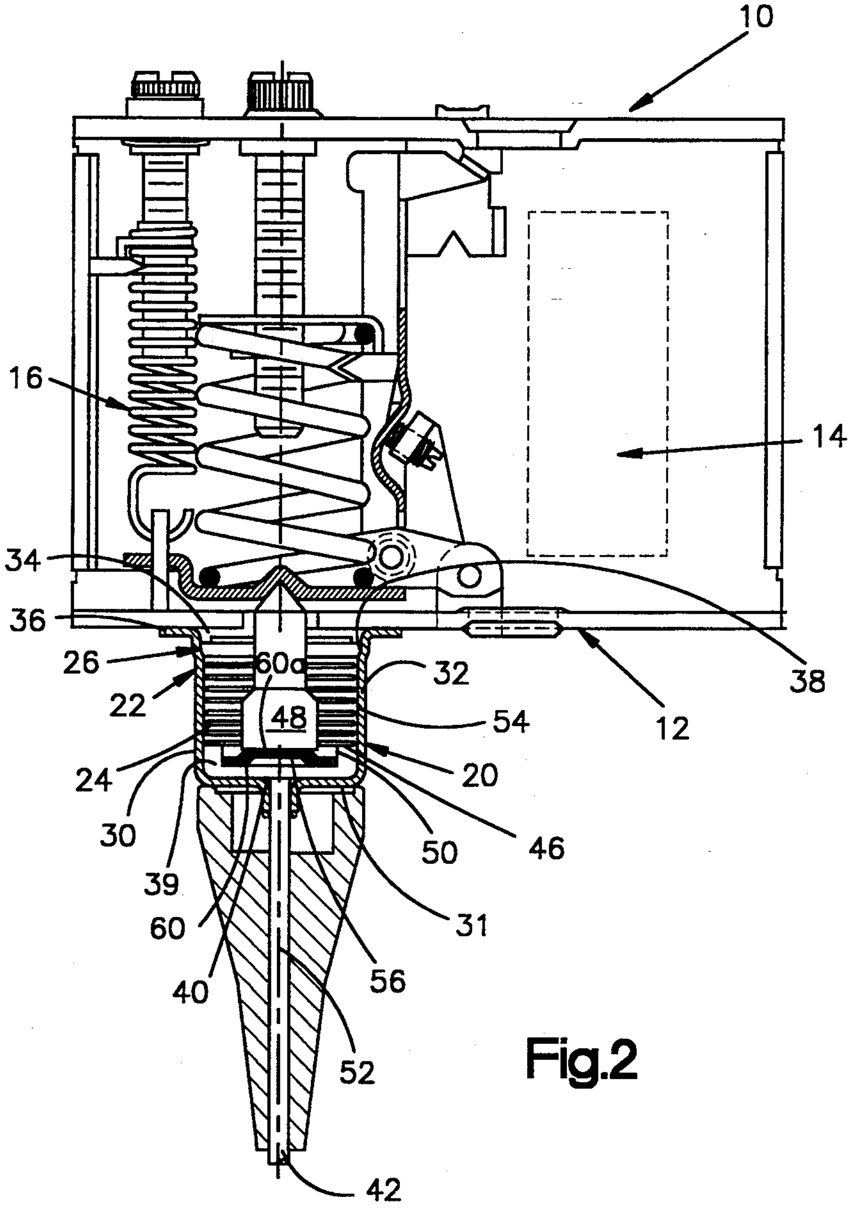
FIG. 2 is a cross sectional view of a control device embodying the present invention having parts illustrated schematically; and, FIG. 3 is an enlarged fragmentary cross sectional view of a portion of the control device illustrated in FIG. 2.

Referring now to the drawings, FIG. 2 illustrates a condition responsive control device 10 constructed according to the invention. The control device 10 comprises a case or housing 12, a controller (such as an electrical switch or a valve, schematically illustrated) 14, a linkage system 16 coupled to the controller, and a condition responsive actuator 20 for actuating the controller 14 via the linkage system 16.

The device 10 is illustrated, by way of example, as constructed and arranged for governing the operation of an electric motor driven condenser cooling fan in a vapor compression refrigeration system (not shown) in response to sensed changes in a condition. The refrigeration system which might be used to chill food in a commercial freezer, for example, has a refrigerant condensing heat exchanger which transfers heat from system refrigerant to ambient atmospheric air to condense high pressure gaseous refrigerant. When heat builds up unduly in the condenser, the refrigerant pressure increases and the control device 10 initiates operation of the condenser cooling fan to increase the heat transfer rate from the condenser. The device 10 thus tends to maintain the condenser temperature at or below a predetermined level by cycling the condenser fan on and off in response to sensed pressure changes in an operating fluid (in this case, the refrigerant itself).

In the illustrated embodiment the operating fluid is the system refrigerant at a particular location in the system such as the condenser discharge. Alternatively, the operating pressure may be that of a confined operating fluid with pressure changes monitored by the device 10 reflecting operating fluid temperature changes at a selected refrigeration system location (e.g. at the condenser outlet). In either case the actuator 20 is animated by operating fluid pressure changes and it transmits motion and force to the controller switch 14 via the linkage system 16.

In the illustrated control device 10 the case 12 is a structurally strong assembly of relatively heavy gauge sheet metal members which rigidly supports the controller switch 14, the linkage system 16 and the actuator 20. The case 12 is constructed for detachable connection to a larger piece of equipment, i.e. the freezer, at a user accessible location. The case 12 may also be associated with a suitable protective cover, not shown, bearing indicia related to pressure or temperature settings, etc.

The linkage system 16 is constructed from levers, springs and adjustment elements which coact so the sensed pressure or temperature values at which the cooling fan cuts-in and cuts-out are adjustable. The adjustment elements and point indicators are supported by the case 12 at accessible, easily seen locations. The case, controller switch 14 and the linkage system 16 may be of any suitable or conventional types and therefore are not illustrated or described in further detail. An example of a commercially available control device employing such components is manufactured by Ranco Incorporated of Columbus Ohio and known as "O10-2054."

Figure 3:
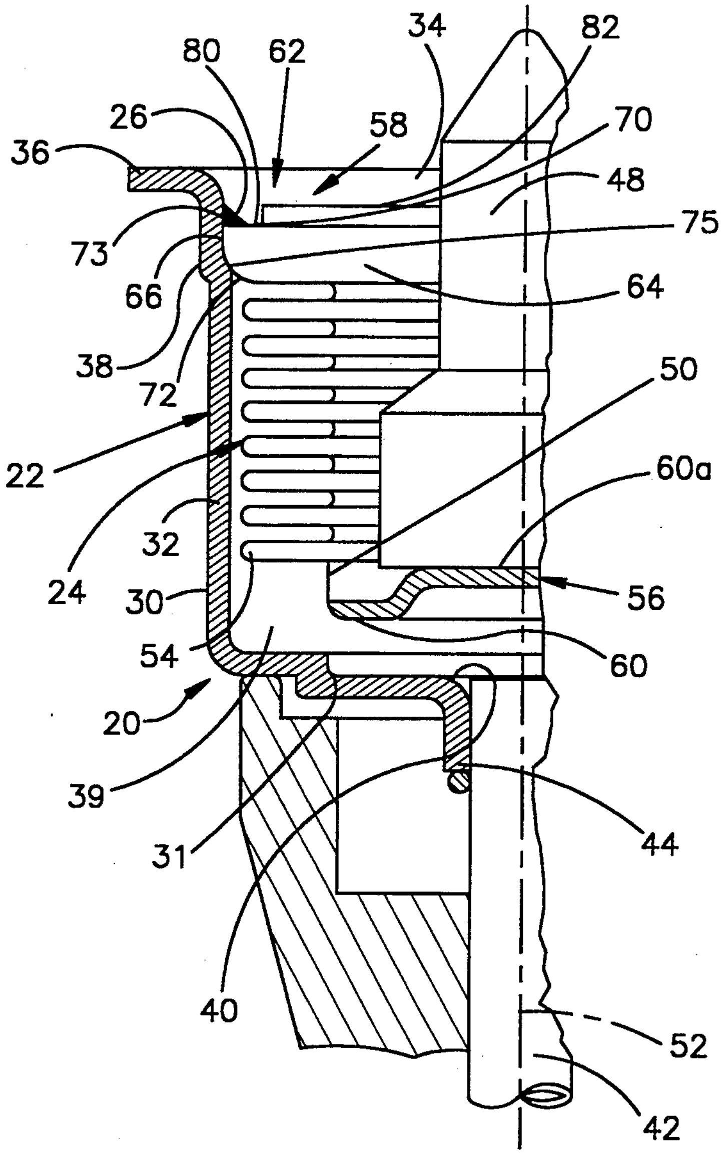

The condition responsive actuator 20 is constructed and arranged to accurately and consistently operate the controller switch 14 via the linkage system 16 in response to operating fluid pressure changes. As illustrated by FIGS. 2 and 3 the actuator 20 comprises a support unit 22 attached to the case 12, a bellows unit 24 carried by the support unit, and connecting structure 26 for rigidly and hermetically securing the support and bellows units together. The bellows unit 24 is anchored to the support unit 22 and extends and retracts relative to the support unit in response to increases and decreases, respectively, in operating fluid pressure. The bellows unit motion actuates the controller switch 14.

The support unit 22 comprises a cup-like bellows supporting housing 30 having a base wall 31, a side wall 32 defining a bellows receiving opening 34, and an outwardly extending mounting flange 36 on the side wall 32 surrounding the opening 34 by which the housing 30 is detachably secured to the case 12 (by screws which are not shown).

The housing side wall 32 defines a bellows unit supporting zone 38 extending continuously about and confronting the bellows unit 24 where it is attached to the housing. At least part of an operating fluid pressure chamber 39 is formed in the housing 30 extending about the bellows unit 24 between the zone 38 and the base wall 31. The chamber 39 is filled with operating fluid. Operating fluid is communicated to the chamber 39 through a port 40 in the base wall 31.

In the illustrated embodiment the operating fluid is communicated with the chamber 39 by a capillary tube 42 and a pressure fitting 44. The illustrated fitting 44 is formed by a drawn nipple-like projection continuous with the cup wall 31. If desired a separate brass fitting, staked to the cup wall 31, may be employed instead of the fitting 44. The fitting 44 is formed so that its projecting portion snugly surrounds the capillary tube. The capillary tube 42 and the fitting 44 are hermetically joined together by a structurally strong bond, such as a braze joint, to insure against loss of operating fluid to the ambient atmosphere.

In the illustrated embodiment the operating fluid is liquified system refrigerant located at the condenser discharge. The capillary tube 42 communicates with the interior of the refrigeration system via a suitable or conventional hermetic pressure tap, or fitting, (not shown) so that the system refrigerant is hermetically contained in the chamber 39 and the capillary tube 42. Thus the actuator operating fluid pressure is the same as the condenser outlet pressure. The condenser outlet refrigerant pressure is a direct function of the condenser outlet refrigerant temperature. Condenser outlet refrigerant pressure increases above a predetermined level signal the need for increasing heat transfer from the condenser. The condenser outlet pressure increase is communicated to the chamber 39 so that the bellows unit is extended and actuates the condenser fan control switch 14 to turn on the condenser fan. The condenser fan directs air flow across the condenser so the condenser is cooled and the outlet refrigerant pressure is reduced accordingly. Condenser outlet pressure reductions to levels below a predetermined pressure are communicated to the actuator, retract the bellows and turn off the condenser fan.

The bellows unit 34 comprises a bellows 46 and a bellows extension pin, or rod, 48 extending between the bellows and the linkage system for transmitting actuating force and motion from the bellows to the linkage. The bellows 46 comprises an thin, continuous wall 50 disposed in a tubular configuration about a longitudinal axis 52. The wall 50 is convoluted so that peripheral convolutions 54 extend about the wall partially along its length between the opposite bellows end structures 56, 58. The wall is formed from thin sheet metal so the convolutions are resiliently flexible and flex to enable the bellows to extend and retract in response to fluid pressure changes in the chamber 39.

The illustrated bellows 46 is a one piece hydroformed bellows fabricated by forming an elongated thin walled cup, placing the cup in a set of dies and subjecting the interior of the cup to extreme liquid pressure. The dies engage the side wall about its periphery and are initially spaced axially apart along the cup. When the internal pressure is applied the cup side wall distends and bulges outwardly between the dies. The dies are forced axially toward each other so that the convolutions 54 are formed between them. After the convolutions are formed the internal pressure is relieved. The depth of the convolutions is determined by the extent of the applied internal pressure and the initial axial spacing between the dies. The shape of the convolutions is determined by the shapes of the axial faces of the dies.

The illustrated bellows and support unit are generally cylindrical, i.e. of circular cross-sectional shape. The bellows may be formed from any suitable material such as beryllium copper or stainless steel coated with a copper flash. The housing 30 is preferably stainless steel.

The bellows end structure 56 is disposed in the housing 30 and shifts relative to the housing in response to sensed operating fluid pressure changes (see FIG. 3). The end structure 56 is formed by a relatively thick bellows end wall 60 which is continuous with the side wall 50 and hermetically closes the bellows end adjacent the housing base wall 31. The end wall 60 is structurally strong and has a central, upwardly dished panel **60*a* supporting the extension pin 48. The end wall 60 is disposed close to the housing base wall 31** but with sufficient clearance that the end wall does not bottom out on the housing base wall during normal operation.

The bellows 46 is connected to the housing 30 by mounting structure 62 spaced axially from the end structure 56 and aligned with the bellows support zone 38. The mounting structure 62 comprises an anchor convolution 64 defining an outer peripherally extending mounting face 66 confronting the support zone 38. In the preferred and illustrated bellows unit the face 66 and the zone 38 are both continuous and tightly engaged with each other. The engagement between the zone 38 and the face 66 provides sealing engagement which is enhanced by the hermetic connection provided by the connecting structure 26.

In the illustrated embodiment the anchor convolution defines second and third faces 70, 72, respectively, which adjoin the mounting face 66 and are formed by radially extending anchor convolution walls. The face 70 faces the open end of the housing 30 and extends in a direction transverse to the direction of extent of the mounting face 66. In the preferred embodiment the face 70 provides a tool engaging surface. The bellows unit is pressed into the housing 30 by an insertion tool which engages the face 70 along its outer periphery and forces the bellows into the housing.

The diameters of the anchor convolution face 66 and the zone 38 have a "press fit" interference relationship so that the bellows must be forced into the housing against substantial frictional resistance. The faces 66, 70 are rigidly related so the bellows position in the housing is accurately controlled by controlling the extent of insertion tool travel as the bellows is pressed into position. In the preferred construction the face 70 is an annular flat, or planar, surface and extends at a right angle with respect to the housing wall 32 and the axis 52. The juncture of the faces 66, 70 forms a relatively sharp circular edge 73 immediately adjacent the housing wall 32.

The face 72 adjoins the mounting face 66 and extends radially inwardly away from the housing wall 32. The illustrated face 72 merges smoothly with the mounting face and defines a semi-spherical guide section extending axially and radially from the face 66. The guide section pilots the bellows unit as the unit is pressed into the housing 30. The guide section provides for smooth, continuous engagement between the anchor convolution face 66 and the zone 38 so when the bellows is pressed into position the juncture between the bellows and the support unit is essentially sealed by the mechanical engagement between the elements. In some devices the housing wall 32 is formed with a arcuate internal shoulder 75 shaped to conform to the guide section when the bellows is properly seated in the housing 30. This enhances the sealing effect and more positively locates the bellows with respect to the housing 30.

In the preferred control device the anchor convolution 64 projects radially outwardly from the bellows axis 52 farther than any of the remaining convolutions 54. During the bellows fabrication process the anchor convolution forming dies are initially spaced farther apart than are the dies which form the convolutions 54. The bellows wall forming the anchor convolution bulges farther outwardly between its dies during the hydro forming process. When the dies are pressed together the anchor convolution created between them is thus diametrically larger. In addition, the anchor convolution forming dies are individually shaped to produce the flat and dished faces 70, 72, respectively, unlike the die pairs forming the convolutions 54 which are all essentially mirror images and serve to form symmetrical convolutions.

The bellows end structure 58 is open to whatever pressure is ambient the device 10 and is constructed and arranged to facilitate hermetic attachment of the bellows and support units by the connecting structure 26. Thus, the bellows is operated to extend or retract to a position dependant upon the difference between the ambient pressure within the bellows and the operating fluid pressure in the chamber 39 surrounding the bellows. In the illustrated device the ambient pressure is atmospheric air pressure.

The preferred end structure 58 serves to form, with the face 70, a trough-like retaining well 80 extending about the junctures of the faces 66, 70 and the zone 38. The illustrated end structure 58 comprises a cylindrical upstanding collar 82 which adjoins the radially inner periphery of the anchor convolution and defines the radially inner side of the well 80. The well 80 is defined between the collar 82, at the inner periphery of the face 70, and the housing wall 32 at the outer periphery of the face 70.

The connecting structure 26 secures the bellows and support units rigidly together with a hermetic joint. In the preferred and illustrated embodiment of the invention the structure 26 comprises a braze joint extending continuously about the juncture of the faces 66, 70 with the zone 38. The brazing compound forming the joint is effectively bonded to the faces and housing wall 32 so that they are rigidly held in place and sealed together as well. The joint is formed by depositing a flux material all along the face 70 within the end structure retaining well 80.

Next a brazing compound is placed in the well. The brazing compound is in the form of a "silver solder" wire which encircles the collar 82. The assembly is then heated by an induction heating coil or a gas torch until the brazing material liquifies and wets the faces 66, 70 and the zone 38 adjacent the faces. The tight fitting relationship between the bellows 46 and the zone 38 insures that the liquified brazing material does not leak from the well 80 along the face 66 while the bonding process is being carried out. The liquified brazing materials tend to wick into any small leakage paths which might exist between the anchor convolution and the zone 38 to further ensure a hermetic joint. The collar 82 forms a dam-like structure which precludes the brazing material from leaking from the inner periphery of the well.

While a single preferred embodiment of the invention has been illustrated and described in detail the invention is not to be construed as limited to the precise construction disclosed. Various adaptations, modifications and uses of the invention may occur to those skilled in the art to which the invention relates. The intention is to cover all such adaptations, modifications and uses within the scope or spirit of the appended claims.

Having described my invention I claim:

1. In an expansible chamber actuator wherein an extensible and retractable bellows unit is carried by a support unit:

a) the support unit comprising:

i) a housing defining a bellows receiving opening with said bellows unit disposed at least partially in said housing, said housing and said bellows unit defining at least part of an operating fluid chamber;

ii) a bellows supporting housing wall surrounding a portion of said bellows unit; and, iii) mounting structure by which said housing may be secured in position;

b) the bellows unit comprising:

i) a tubular bellows having opposite ends, one of which is closed, and a thin imperforate wall extending between the ends about a longitudinal axis;

ii) said bellows wall defined in part by a resiliently flexible convolution which flexes to enable extension and retraction of the bellows in the direction of said axis; and, iii) an anchor convolution spaced from said closed end of said bellows, said anchor convolution defining a peripheral surface confronting said bellows supporting housing wall and a convolution wall continuous with and rigidly related to said peripheral surface, said convolution wall extending radially inwardly from said peripheral surface to form an external annular face contiguous with said peripheral surface; and, c) bonding material flowable onto said bellows supporting housing wall and said anchor convolution peripheral surface, said external annular face supporting fluent bonding material in position for defining a hermetic bond between said bellows supporting wall and said anchor convolution peripheral surface so that when the chamber pressure changes relative to ambient pressure the bellows is subjected to differential pressure forces tending to move the bellows closed end with respect to the anchor convolution.

2. The actuator claimed in claim 1 wherein said anchor convolution peripheral surface and said support unit wall are circularly curved.

3. The actuator claimed in claim 1 wherein said anchor convolution surface engages said bellows supporting housing wall substantially continuously about the bellows periphery.

4. The actuator claimed in claim 3 wherein said anchor convolution further comprises a second convolution wall adjoining said anchor convolution peripheral surface and extending axially from said peripheral surface and radially inwardly away from said housing wall.

5. The actuator claimed in claim 4 wherein said second convolution wall is arcuately curved to form a guide face confronting said housing wall as said anchor convolution is inserted in said bellows receiving opening.

6. The actuator claimed in claim 1 wherein one of said bellows ends is open and said anchor convolution is disposed adjacent said open bellows end.

7. The actuator claimed in claim 6 wherein said open bellows end further comprises an axially extending annular collar adjoining a radially inner periphery of said anchor convolution wall, said collar and anchor convolution wall maintaining liquified bonding material at the juncture of said bellows supporting housing wall and said anchor convolution peripheral surface.

8. The actuator claimed in claim 1 wherein said bellows further comprises an annular axially extending bellows wall adjoining an inner periphery of the anchor convolution wall, said annular axially extending bellows wall and said anchor convolution forming a trough-like space for maintaining bonding material at the juncture of said housing wall and said anchor convolution.

9. The actuator claimed in claim 1 wherein said bonding material comprises a brazing material extending continuously about said anchor convolution and said bellows supporting housing wall.

10. The actuator claimed in claim 1 wherein said housing is a cup-like member having a base wall extending adjacent the closed end of the bellows and with said chamber extending about the bellows within the cup-like member, said bellows support unit further comprising a fitting attached to the cup-like member base wall for communicating fluid pressure into the chamber.

11. The actuator claimed in claim 10 wherein said closed end of said bellows is defined by a transversely extending wall.

12. A method of making an actuator comprising the steps of:

a. forming a bellows comprising:

i. constructing a tubular body having a thin wall disposed about a longitudinal axis and extending from a closed end to an opposite end;

ii. convoluting the body wall;

iii). forming an annular anchor convolution extending about said bellows body and projecting radially outwardly therefrom to define an outer peripheral mounting face and an anchor convolution wall extending radially inwardly from said mounting face to define an external face rigidly fixed to said peripheral mounting face, said mounting face disposed between said external face and said closed end;

b. forming a bellows support unit comprising the step of constructing a housing having a bellows receiving opening and a bellows support zone;

c. aligning the bellows with the bellows receiving opening and inserting the bellows into the bellows receiving opening by engaging the external convolution wall face adjacent the mounting face and forcing said bellows into said bellows support zone to a position where said anchor convolution mounting face confronts and engages the bellows support zone substantially continuously about the periphery of said mounting face; and, d. connecting the anchor convolution mounting face to the housing zone comprising the step of hermetically bonding the mounting face and zone together.

13. The method claimed in claim 12 wherein forming the anchor convolution wall external face comprises forming a flat annular wall extending radially outwardly from the body wall.

14. The method claimed in claim 13 wherein inserting said bellows comprises forcing said anchor convolution into tight mechanical engagement with said bellows support zone.

15. The method claimed in claim 14 wherein connecting said anchor convolution to said zone comprises brazing said convolution to said housing.

16. The method claimed in claim 13 further comprising forming a well extending about said anchor convolution, depositing brazing materials in said well and heating the actuator.

17. A pressure operated actuator comprising a bellows unit, a bellows support unit and bonding means fixing the bellows unit to the support unit;

a. said bellows unit comprising:

i. an elongated continuous tubular convoluted wall disposed about a longitudinal axis;

ii. bellows end structure comprising an end wall hermetically closing one longitudinal end of said wall;

iii. bellows mounting structure spaced in the direction of said longitudinal axis from said bellows end structure and comprising an anchor convolution defining an outer peripheral mounting face and an adjoining generally longitudinally oriented face continuous with said mounting face, said longitudinally oriented face extending transverse to the direction of extent of said mounting face and having a radially outer section rigidly connected to said mounting face with said mounting face disposed between said bellows end structure and said longitudinally oriented face;

b. said bellows support unit comprising a support member disposed about said anchor convolution, said support member defining an inner peripherally extending bellows support zone extending substantially continuously about said bellows unit and confronting said mounting face;

c. said bonding means bonded to said mounting face and to said support zone to hermetically secure said bellows unit and said support unit together so that upon establishment of a pressure differential between the inside and outside of said bellows unit said bellows unit is subjected to a differential pressure force tending to extend or retract the bellows end structure relative to said support member.

18. The actuator claimed in claim 17 wherein said mounting face and said bellows support zone are annular and disposed about said axis.

19. The actuator claimed in claim 18 wherein said bonding means comprises an element formed from brazing material.

20. The actuator claimed in claim 17 wherein the juncture of said peripheral mounting face and said longitudinally oriented face is defined by a circular edge.

21. The actuator claimed in claim 20 wherein said mounting face defines a generally cylindrical section extending from said juncture.

22. The actuator claimed in claim 21 wherein said mounting face further includes an arcuately curved section extending from said cylindrical section inwardly toward said axis.

23. The actuator claimed in claim 17 wherein said support member defines at least part of a chamber extending about said end structure, said bellows unit subjected to differential pressure forces tending to move said end structure relative to said mounting structure when pressure in said chamber changes.

24. A condition responsive control device comprising a case, controller means carried by said case, a linkage system supported by said case and coupled to said controller means for operating said controller means, and condition responsive actuator means for actuating said linkage system in response to changes in a sensed condition; said actuator means comprising a bellows unit, a bellows support unit and connecting means between the bellows unit and the bellows support unit;

a. said bellows unit comprising:

i. an elongated continuous tubular convoluted wall disposed about a longitudinal axis;

ii. bellows end structure comprising an end wall hermetically closing one longitudinal end of said tubular wall;

iii. bellows mounting structure spaced in the direction of said longitudinal axis from said bellows end structure and comprising an anchor convolution defining an outer peripheral mounting face and first and second generally longitudinally oriented faces adjoining respective opposite axial ends of said mounting face and extending transverse to the direction of extent of said mounting face;

b. said bellows support unit comprising a support member disposed about said anchor convolution, said support member defining an inner peripherally extending bellows support zone extending substantially continuously about said bellows unit and confronting said mounting face;

c. said connecting means bonded to said mounting face and to said support zone to secure said bellows unit to said support unit so that upon establishment of a pressure differential between the inside and outside of said bellows unit said bellows unit end structure extends and retracts relative to said support member, one of said first and second longitudinally oriented anchor convolution faces supporting said bonding means in position with respect to said mounting face and said support zone during bonding.

* * * * *